United States Patent
Maier et al.

(10) Patent No.: US 11,873,421 B2
(45) Date of Patent: Jan. 16, 2024

(54) WATER-BASED COMPOSITION WITH IMPROVED TRANSPARENCY

(71) Applicant: SIKA TECHNOLOGY AG, Baar (CH)

(72) Inventors: Steffen Maier, Wettingen (CH); Javier Lara, Corregidora (MX); Joel Kunz, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 390 days.

(21) Appl. No.: 17/418,338

(22) PCT Filed: Mar. 16, 2020

(86) PCT No.: PCT/EP2020/057150
§ 371 (c)(1),
(2) Date: Jun. 25, 2021

(87) PCT Pub. No.: WO2020/187854
PCT Pub. Date: Sep. 24, 2020

(65) Prior Publication Data
US 2022/0064503 A1 Mar. 3, 2022

(30) Foreign Application Priority Data
Mar. 21, 2019 (EP) .................................. 19164283

(51) Int. Cl.
*C09J 125/14* (2006.01)
*C09J 5/00* (2006.01)
*C09J 11/04* (2006.01)
*C09J 133/06* (2006.01)

(52) U.S. Cl.
CPC .............. *C09J 125/14* (2013.01); *C09J 5/00* (2013.01); *C09J 11/04* (2013.01); *C09J 133/062* (2013.01); *C09J 2425/00* (2013.01); *C09J 2433/00* (2013.01)

(58) Field of Classification Search
CPC ... C09J 125/14; C09J 5/00; C09J 11/04; C09J 133/062; C09J 2433/00
See application file for complete search history.

(56) References Cited

U.S. PATENT DOCUMENTS

2013/0210993 A1* 8/2013 Naito ....................... B32B 7/12
524/560

FOREIGN PATENT DOCUMENTS

| DE | 198 01 892 A1 | 7/1999 |
| EP | 0 121 083 A1 | 10/1984 |
| EP | 0 490 191 A2 | 6/1992 |
| EP | 0 620 243 A1 | 10/1994 |

OTHER PUBLICATIONS

Aug. 7, 2020 International Search Report issued in International Patent Application No. PCT/EP2020/057150.
Aug. 7, 2020 Written Opinion issued in International Patent Application No. PCT/EP2020/057150.

* cited by examiner

*Primary Examiner* — Daniel McNally
(74) *Attorney, Agent, or Firm* — Oliff PLC

(57) ABSTRACT

A single-component sealant or adhesive composition, including: a) an aqueous polymer dispersion comprising water and at least one water-dispersed polymer P having a median particle size D50 of less than 150 nm, b) at least one water-dispersed or water-dissolved epoxy- or carbodiimide-functional cross-linker C, wherein the pH of the composition is adjusted in the range of 7 to 12, and wherein the at least one water-dispersed polymer P is included in the composition with an amount of at least 45 wt.-%, based on the total composition, and wherein the epoxy- or carbodiimide-functional cross-linker C is included in the composition with an amount of between 0.5 and 5 wt.-%, based on the total composition.

13 Claims, No Drawings

WATER-BASED COMPOSITION WITH IMPROVED TRANSPARENCY

TECHNICAL FIELD

The invention relates to aqueous one-component sealants and adhesives based on polymer dispersions and their use.

BACKGROUND OF THE INVENTION

Single-component sealant or adhesives and adhesives based on aqueous dispersions of polymers are commonly used, for example in the construction industry for sealing joints or coating surfaces to form a protective layer or to seal joints or surfaces against water and other ambient influences.

Compared to solvent-based sealants and reactive silane-curable sealants, water-based sealants mainly have the advantage that they do not emit as many volatile organic compounds (VOC) that are hazardous to health and the environment. Furthermore, they have generally a lower odor and are thus more consumer-friendly and suitable for indoor applications. Their curing or rather hardening mechanism to form a durable, elastic sealant or adhesive material mainly involves drying of substantial parts of the water contained in the dispersion and increasing physical interactions between the polymers contained therein with decreasing water content. Such sealants and adhesives based on aqueous polymer dispersions thus usually simply solidify by evaporation of water. If the ambient temperature exceeds the minimum film forming temperature (MFFT), the water starts to evaporate at a significant rate and the polymer chains entangle and form a film. The cohesion of such materials is primarily based on physical interactions. Comparable to typical thermoplastics, these dried compositions normally suffer from mediocre mechanical properties, a tendency to creep under static loads, poor heat resistance, and swelling in many media such as water or solvents. One option to overcome these drawbacks is the use of chemical crosslinking reactions, e.g. with isocyanates or epoxides. These systems are, however, often not storage stable in the form of single-component (1K) systems and thus generally need to be formulated at least in two-component (2K) systems with separated storage of the reactive species and the need for mixing before application. Other known options for chemical cross-linking involve the use of oxazolines, or carbodiimides, or multivalent ions such as Zirconium. However, also in these cases, the storage stability in 1K systems is generally low, and the gain of mechanical performance is in most cases not comparable to true 2K systems.

One often desired property in sealants or adhesives is translucency or transparency, thus offering an esthetically pleasing appearance or a desirable low visibility of sealants and adhesives after application on a substrate. Silicones, for example, or curable compositions based on silane-terminated polymers can be formulated in a transparent manner by using selected fillers and other ingredients. However, they commonly suffer from yellowing due to reactions of the amine compounds contained therein, especially under influence of UV light and/or oxidative chemical compounds.

Regarding the formulation of water-based sealants and adhesives, transparent products can be formulated as well and are nowadays commercially available. Aqueous polymer dispersions in the uncured or wet state are, however, usually more or less opaque. For this reason, transparent sealants and adhesives based on polymer dispersions become clear only after drying, a process that usually takes many days or even weeks, depending on the layer thickness.

To address this problem, commercially available translucent or even transparent water-based polymer dispersions have either a low solid content, which is not useful due to high shrinkage upon drying, or a very small particle size regarding the polymers dispersed therein. However, polymer dispersions with a low particle size normally need very efficient stabilization due to the high surface area of the polymer particles. Stabilization is usually done with surfactants that can be ionic or non-ionic, but in either way reduce the water resistance of the resulting products tremendously. This leads for example to the unwanted effect that the compositions swells considerably under water influence and/or suffers from unwanted blushing or whitening effects when in contact with water.

The use of cross-linkers as described above does normally improve water-resistance also in transparent formulation, but with the detrimental effect that the transparency of the composition is significantly diminished.

There is therefore a need for 1K water-based sealants and adhesives with high transparency both in the wet and dry state and at the same time high water resistance and low volume shrinkage that can be formulated without large amounts of surfactants.

SUMMARY OF THE INVENTION

The object of the present invention is to provide a single-component water-based sealant or adhesive with high transparency both in the wet and dry state and resistance, e.g. towards water immersion, which at the same time exhibits good storage stability.

The composition according to the present invention is especially suitable for sealing joints or surfaces, but may also be employed as, in particular elastic, adhesive.

It was found that the water resistance (e.g. Shore hardness after water immersion and swelling from water uptake) of specific transparent polymer dispersions can be greatly increased by specific means of post-crosslinking, according to claim 1. Surprisingly, even the waiting time after application until optical clarity is achieved is dramatically reduced, compared to non-crosslinked compositions.

Thus, surprisingly, it was found that the incorporation of an epoxy- or carbodiimide-functional cross-linker C with an amount of between 0.5 and 5 wt.-%, based on the total composition, in an aqueous polymer dispersion having a pH of 7-12 and comprising at least one water-dispersed polymer P having a median particle size D50 of less than 150 nm, wherein said at least one water-dispersed polymer P is comprised in the composition with an amount of at least 45 wt.-%, based on the total composition, improves the transparency and water-resistance of said composition in the wet or cured state and when in contact with water.

According to another aspect of the present invention, a method for sealing a joint or adhesively joining two substrates is provided.

DETAILED DESCRIPTION OF THE INVENTION

Substance names beginning with "poly", such as polyepoxide, designate substances which formally contain, per molecule, two or more of the functional groups occurring in their names. For instance, a polyepoxide refers to a compound having at least two epoxy groups. A polyether refers to a compound having at least two ether groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth) acrylate monomers and copolymers of (meth)acrylate monomers with other vinyl group containing monomers are also included within the term "polyacrylate polymer". The terms "polyacrylate polymer", "polyacrylate" and "acrylate polymer" are used interchangeably.

The term "solid epoxy resin" is very well known to the person skilled in the art in the epoxide sector and is used in contrast with "liquid epoxy resin". The glass transition temperature $T_G$ of the solid epoxy resins is above room temperature of 25° C., i.e. they can be comminuted at room temperature to give pourable particles. The term "viscosity" refers to the dynamic viscosity or shear viscosity which is determined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

The term "shelf life" designates a time period after which a dispersion adhesive composition has substantially coagulated, separated or settled such that it cannot be readily applied to a surface of a substrate as homogeneous, uniform film or bead.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "room temperature" (abbreviated "RT") designates a temperature of 23° C.

The term "standard pressure" designates an absolute pressure of 1 bar.

The present invention relates in a first aspect of the invention to a single-component sealant or adhesive composition, comprising:

a) an aqueous polymer dispersion comprising water and at least one water-dispersed polymer P having a median particle size D50 of less than 150 nm,
b) at least one water-dispersed or water-dissolved epoxy- or carbodiimide-functional cross-linker C, wherein the pH of the composition is adjusted in the range of 7 to 12, and wherein said at least one water-dispersed polymer P is comprised in the composition with an amount of at least 45 wt.-%, based on the total composition, and wherein said epoxy- or carbodiimide-functional cross-linker C is comprised in the composition with an amount of between 0.5 and 5 wt.-%, based on the total composition.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase. The term "aqueous polymer dispersion" refers to a polymer dispersion having water as the main carrier or continuous liquid phase. Preferably, the "aqueous" refers to a 100% water carrier, meaning no other, organic solvents are contained therein.

The single-component sealant or adhesive composition according to the present invention comprises as a first essential ingredient an aqueous polymer dispersion comprising water and at least one water-dispersed polymer P having a median particle size D50 of less than 150 nm, preferably 120 nm or less, in particular 100 nm or less.

Preferably, dispersed polymer P has a median particle size D50 in the range of 5-140 nm, more preferably of 10-120 nm, most preferably 15-100 nm.

The term "median particle size D50" refers in the present disclosure to a particle size below which 50% of all particles by volume are smaller than the D50 value. The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

Suitable polymers P include, for example, polyvinyl acetate, polyvinyl alcohol, poly(meth)acrylates, polyurethanes, polyurethane-(meth)acrylates, natural based polymers, polystyrene-copolymers, carboxylated or otherwise functionalized butadiene styrene copolymers, carboxylated or otherwise functionalized butadiene rubbers, carboxylated or otherwise functionalized styrene-butadiene copolymers, carboxylated or otherwise functionalized styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, ethylene-acrylic ester copolymers, and carboxylated or otherwise functionalized polyolefinc block copolymers.

The above-mentioned copolymers, meaning polymers made from more than one type of monomer, can be block type copolymers or random copolymers.

The amount of said at least one water-dispersed polymer P comprised in the composition is at least 45 wt.-%, based on the total composition, preferably between 45 and 80 wt.-%, more preferably between 45 and 75 wt.-%, in particular between 50 and 65 wt.-%, based on the total weight of the composition in the fresh, undried and uncured state.

Polymers P may be functionalized, meaning they contain further functional groups selected from carboxylic acid groups, amino groups, and hydroxyl groups, but may additionally also comprise other functional groups, such as anhydride, acrylate, silane, and/or glycidyl(meth)acrylate groups.

In some preferred embodiments, the aqueous polymer dispersion comprises of one or more water-dispersed polymers P, preferably free-radically polymerized polymer(s) obtained from ethylenically unsaturated monomers or polyurethane polymers. Preferably, in the case of free-radically polymerized polymer(s), such polymers contain principal monomers selected from the group consisting of $C_1$-$C_{20}$-alkyl (meth)acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers.

In particular, acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like, may be used. Silicon-containing monomers such as, for example, vinyl trialkoxysilanes including vinyl trimethoxysilane, allyl trialkoxysilanes including allyl trimethoxysilane, (meth)acryloxyalkyl trialkoxysilanes including methacryloxypropyl trimethoxysilane, (meth)acryloxyalkyl alkyldialkoxysilanes including methacryloxypropyl methyldiethoxysilane, (meth)acryloxyalkoxyalkyl trialkoxy silanes including methacryloxyethoxyethyl trimethoxysilane, and mercaptoalkyl trialkoxysilanes including mercaptopropyl trimethoxysilane may also be incorporated, preferably at a level of from about 0.01% to about 6%, by weight based on the weight of the acrylic emulsion copolymer. Proportions of ethylenically-unsaturated monocarboxylic acids such as, for example, from 0 to about 7%, by weight, based on the weight of the acrylic emulsion copolymer, methacrylic acid or acrylic acid may also preferably be used.

Preferred $C_1$-$C_{20}$-alkyl (meth)acrylates for the production of (meth)acrylate-based polymers P include (meth)acrylic acid alkyl esters having a $C_1$-$C_{12}$ alkyl radical, such as methyl (meth)acrylate, n-butyl acrylate, ethyl acrylate, and 2-ethylhexyl acrylate. Polymers obtained by polymerization of mixtures of acrylic acid alkyl esters and (meth)acrylic acid alkyl esters can be mentioned as particularly suitable polymers.

Suitable vinyl esters of carboxylic acids containing up to 20 carbon atoms include, for example, vinyl laurate, vinyl stearate, vinyl propionate, vinyl esters of tertiary saturated monocarboxylic acids, vinyl acetate, and mixtures of two or more thereof.

Suitable vinyl aromatic compounds include, for example, vinyltoluene, α- and p-methylstyrene, α-butylstyrene, 4-n-butylstyrene, 4-n-decylstyrene and styrene. Acrylonitrile and methacrylonitrile are presented as examples of suitable nitriles. Suitable vinyl halides include, for example ethylenically unsaturated compounds substituted by chlorine, fluorine or bromine, such as vinyl chloride or vinylidene chloride, and mixtures thereof.

For the preparation of suitable water-dispersed or -dispersible polymers P based on acrylic monomers there are furthermore suitable non-aromatic hydrocarbons containing from 2 to 8 carbon atoms and at least two olefinic double bonds, such as butadiene, isoprene and chloroprene.

Further monomers that may be present in the water-dispersible polymer in an amount of 0-40% by weight, preferably from 0-20% by weight and most preferably 0.2-10% by weight, are especially $C_1$-$C_{10}$-hydroxyalkyl (meth)acrylates, (meth)acrylamides and derivatives thereof substituted on the nitrogen by $C_1$-$C_4$-alkyl, ethylenically unsaturated carboxylic acids, dicarboxylic acids, their semi-esters and anhydrides, for example (meth)acrylic acid, maleic acid, fumaric acid, maleic acid anhydride, maleic acid and fumaric acid semi-esters and itaconic acid.

Suitable water-dispersed or -dispersible polymers P preferably have a number average molecular weight ($M_n$) in the range of 5,000-200,000 g/mol, preferably 25,000-200,000 g/mol, most preferably 50,000-200,000 g/mol. Suitable water-dispersed or -dispersible polymers P preferably have a weight average molecular weight ($M_w$) in the range of 50,000-800,000 g/mol, preferably 100,000-800,000 g/mol, most preferably 150,000-800,000 g/mol.

Preferably, the at least one water-dispersed or -dispersible polymer P has a number average molecular weight ($M_n$) of not more than 200,000 g/mol and a weight average molecular weight ($M_w$) of at least 100,000 g/mol.

The number average and weight average molecular weights can be determined by gel permeation chromatography using polystyrene as standard in a polymer solution in tetrahydrofuran.

The water-dispersed polymers/copolymers based on ethylenically unsaturated monomers which are useful as polymer P can be prepared by free-radical polymerization using substance, solution, suspension or emulsion polymerization techniques, which are known to the person skilled in the art. Preferably, if polymer P is polyurethane-based, thus forming a polyurethane dispersion (PUD), said polymer dispersion is obtained by dispersing an NCO-functional polyurethane polymer in water. Preferably, (meth)acrylate-based dispersions of polymer P are obtained by emulsion polymerization, so that aqueous polymer dispersions are obtained.

Suitable polyacrylate dispersions and preparation method thereof are described, for example in EP 0490191 A2, DE 19801892 A1, and in EP 0620243.

Suitable dispersible such polymers or ready-to-use aqueous dispersions thereof are commercially available, for example by BASF under the trade name Acronal®, or by DOW under the trade name Primal®, or by SYNTHOMER under the trade names Plextol® and Revacryl®. A particularly preferred aqueous dispersion is available under the trade name DC SA13A by Grupo Industrial del Parque S.A. (GIP S.A.), Mexico. This dispersion in particular does not need any thixotropic additive while still enabling an advantageously thixotropic composition. Another preferred aqueous dispersion is Orgal® PR 056 by Organik Kimya, Turkey.

Furthermore suitable and preferred as polymer P are dispersible polyurethane polymers which in water-dispersed form are also denoted as polyurethane dispersions (PUDs). One important requirement is that comprise functional groups selected from carboxylic acid groups, amino groups, and hydroxyl groups. Also these polymers are commercially available as dispersible polymers or ready-to-use dispersions or they can be produced by known methods.

In especially preferred embodiments of the single-component sealant or adhesive composition according to the present invention, the at least one water-dispersed polymer P is selected from polyurethane polymers, poly(meth)acrylate polymers, styrene-(meth)acrylate copolymers, vinyl-acetate-ethylene copolymers, and vinyl-acetate-(meth)acrylate copolymers.

Most preferred as polymer P in the inventive composition is a poly(meth)acrylate polymer or a styrene-(meth)acrylate copolymer.

The single-component sealant or adhesive composition according to the present invention comprises as a second essential ingredient at least one water-dispersed or water-dissolved epoxy- or carbodiimide-functional cross-linker C, preferably with a nominal epoxy- or carbodiimide-functionality of at least 2 or a nominal epoxy- or carbodiimide-functionality of at least 1 and simultaneously having other functional groups able to cross-link with functional groups of polymer P or cross-linker C.

The term "nominal functionality" (f) means the average or actual functionality of a given substance or polymer with regards to a specific functional group. For example, a pure polyether diol has a hydroxyl nominal functionality of f=2. Likewise, glycerin has a nominal functionality of 3 with regards to hydroxyl groups.

Said epoxy- or carbodiimide-functional cross-linker C is comprised in the composition with an amount of between 0.5 and 5 wt.-%, based on the total composition. In preferred embodiments, said epoxy- or carbodiimide-functional cross-linker C is comprised with an amount of between 1 and 4 wt.-%, based on the total composition. Below 0.5 wt.-% and above 5 wt.-% of cross-linker C, the composition exhibits poorer optical performance (such as transparency and general aspect).

Suitable as glycidyl ethers are all based on polyhydroxy compounds, such as diols or triols, where at least two of the hydroxyl groups were converted to glycidyl groups. One suitable and preferred diglcyidyl ether is the diglcyidyl ether of 1,6-hexanediol (available under the trade name Araldite® DY-H from Huntsman).

Furthermore suitable and preferred are epoxy-functional silanes, in particular glycidoxysilanes (also called glycidyloxysilanes), such as 3-glycidoxypropyl-trimethoxysilane, 3-glycidoxypropyltriethoxysilane, or 3-glycidoxypropyl-methyldimethoxysilane. A preferred epoxy-functional silane is Silquest® A-187 (Momentive).

In some preferred embodiments of the inventive single-component sealant or adhesive composition, said cross-linker C is an epoxy-functional resin, preferably with an epoxy equivalent weight of between 100 and 3000 g/eq, in particular between 100 and 1500 g/eq.

Preferably, if cross-linker C it is a solid, insoluble resin, the resin has a particle size not larger than the polymer P dispersed in the composition.

The epoxy resin with more than one epoxy group per molecule on the average suitable as cross-linker C may be a liquid epoxy resin or a solid epoxy resin. The term "solid epoxy resin" is very familiar to the person skilled in the art of epoxides, and is used in contrast to "liquid epoxy resins." The glass transition temperature of solid resins is above room temperature, i.e., at room temperature they can be broken up into free-flowing particles.

Preferred solid epoxy resins have formula (X):

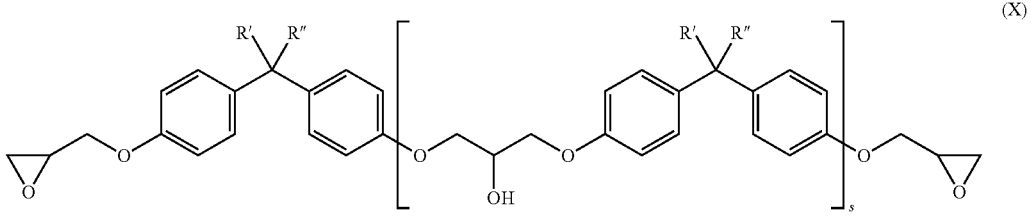

The epoxy- or carbodiimide-functional cross-linker C may be a polymer or resin, or it may be an individual small molecule.

In some preferred embodiments of the single-component sealant or adhesive composition according to the present invention, said cross-linker C is an epoxy-functional cross-linker.

In some preferred embodiments of the invention, said epoxy-functional cross-linker C is a polyglycidyl ether, in particular a diglycidyl (mono- or poly)ether, or an epoxy-functional silane.

Here the substituents R' and R" each independently stand for either H or $CH_3$. Furthermore, the subscript s stands for a number >1.5, in particular a number from 2 to 12.

Such solid epoxy resins are commercially available, for example, from Dow or Huntsman or Hexion.

Compounds of formula (X) with a subscript s between 1 and 1.5 are called semisolid epoxy resins by the person skilled in the art. For the present invention here, they are also considered as solid resins. However, epoxy resins in the narrower sense are preferred, i.e., for which the subscript s has a value >1.5.

Preferred liquid epoxy resins have formula (XI):

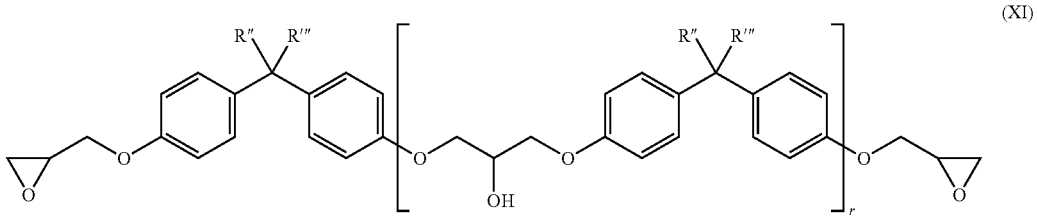

Here the substituents R" and R'" each independently stand for either H or CH₃. Furthermore, the subscript r stands for a number from 0 to 1. The subscript r preferably stands for a number less than 0.2.

These compounds are therefore preferably diglycidyl ethers of bisphenol A (DGEBA), bisphenol F, and bisphenol A/F (the designation "NF" here refers to a mixture of acetone and formaldehyde used as the starting material in its manufacture). Such liquid resins are available, for example, as Araldite® GY 250, Araldite® PY 304, Araldite® GY 282 (Huntsman), or D.E.R.™ 331, or D.E.R.™ 330 (Dow), or Epikote 828 (Hexion).

Furthermore, "novolacs" are suitable as cross-linker C. These have in particular the following formula:

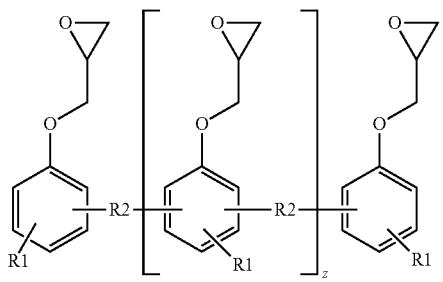

where R2=

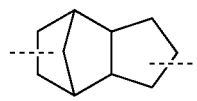

or CH₂,
R1=H or methyl and z=0 to 7.

Here these can be in particular phenol or cresol novolacs (R2=CH₂). Such epoxy resins are commercially available under the trade names EPN or ECN as well as Tactix® from Huntsman or as the D.E.N.™ product line from Dow Chemical.

Suitable epoxy-functional cross-linkers C are in particular:
  Glycidyl ethers of difunctional saturated or unsaturated, branched or unbranched, cyclic or open-chain C₂-C₃₀ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether;
  Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane;
  Glycidyl ethers of phenol compounds and aniline compounds, in particular N,N-diglycidyl aniline, and p-aminophenyl triglycidyl ether;
  Epoxidized di- and polycarboxylic acids, in particular phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester;
  Epoxidized difunctional or trifunctional, low molecular weight or high molecular weight polyether polyols, in particular polyethylene glycol diglycidyl ether or polypropylene glycol diglycidyl ether.
  Epoxy resins, in particular diglycidyl ethers of bisphenol A and/or F.

Hexanediol diglycidyl ether, polypropylene glycol diglycidyl ether, and polyethylene glycol diglycidyl ether are especially preferred.

Suitable liquid epoxy resin comprises customary technical epoxy resins which are fluid at room temperature and have a glass transition temperature of below 25° C. They are obtained conventionally from the glycidylization of compounds having at least two active hydrogen atoms, more particularly polyphenols, polyols or amines, by reaction with epichlorohydrin.

Suitability as liquid epoxy resin is possessed by aliphatic or cycloaliphatic epoxy resins, more particularly
  glycidyl ethers of saturated or unsaturated, branched or unbranched, cyclic or open-chain di-, tri- or tetrafunctional C₂ to C₃₀ alcohols, more particularly ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;
  glycidyl ethers of hydrogenated bisphenol A, F or A/F, or ring-hydrogenated liquid bisphenol A, F or A/F resins;
  N-glycidyl derivatives of hydantoins, amides or heterocyclic nitrogen bases, such as, in particular, triglycidyl cyanurate or triglycidyl isocyanurate.

Preferred as liquid epoxy resin are aromatic epoxy resins, more particularly
  glycidyl ethers of polyphenols, more particularly of resorcinol, hydroquinone, pyrocatechol, 2,2-bis(4-hydroxyphenyl)propane (bisphenol A), bis(hydroxy-phenyl) methane (bisphenol F), bisphenol A/F, bis(4-hydroxy-3-methyl-phenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxy-phenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl) hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)-cyclohexane (bisphenol Z)) 1,1-bis(4-hydroxyphenyl)-3,3,5-trimethylcyclohexane
  (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxybiphenyl (DOD), 4,4'-dihydro-xybenzophenone, bis(2-hydroxynaphth-1-yl)methane, bis(4-hydroxynaphth-1-yl) methane, 1,5-dihydroxynaphthalene, tris(4-hydroxyphenyl)methane, 1,1,2,2-tetrakis(4-hydroxyphenyl) ethane, bis(4-hydroxyphenyl) ether or bis(4-hydroxyphenyl) sulfone;
  glycidyl ethers of condensation products of phenols with aldehydes, obtained under acidic conditions, more particularly glycidyl ethers of phenol-formaldehyde novolacs or cresol-formaldehyde novolacs;

glycidylization products of aromatic amines, more particularly of aniline, toluidine, 4-aminophenol, 4,4'-methylenediphenyldiamine, 4,4'-methy-lenediphenyldi (N-methyl)amine, 4,4'-[1,4-phenylenebis(1-methylethylidene)]-bisaniline (bisaniline P) or 4,4'-[1,3-phenylenebis(1-methylethylidene)]bisaniline (bisaniline M).

Particularly preferred as liquid epoxy resin are diglycidyl ethers of bisphenol A or bisphenol F or bisphenol A/F, as are available commercially, for example, from Dow, Huntsman or Momentive. These liquid epoxy resins have readily manageable viscosity and allow high strengths and resistance properties.

In other preferred embodiments of the composition according to the present invention, said cross-linker C is a carbodiimide-functional cross-linker.

Suitable carbodiimide-functional crosslinkers C are all those that are suitable for aqueous dispersions in general.

Such carbodiimides generally comprise aliphatic or aromatic dinitrogen analogue of carbonic acid of the generalized structure:

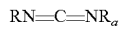

$$RN=C=NR_a$$

where R and $R_a$ individually can be a hydrogen atom or an aliphatic or aromatic group. Aliphatic groups comprise alkyl chains containing between 1 and 20 carbon atoms, and can include branched or cyclic sections, for example a dicarbodiimide such as dicyclohexyl carbodiimide.

Emulsified or water soluble polyfunctional carbodiimides can comprise the reaction product of mono, -di, or tri-cycloaliphatic or saturated aliphatic isocyanates where diisocyanates are preferred. The cycloaliphatic structure can contain 5 to 7 carbons and can be substituted with alkyl groups having 1 to 6 carbons and oxygen while the saturated aliphatic structures can contain 1 to about 18 carbons.

The preparation of water dispersible carbodiimide crosslinkers is well known in the art.

A detailed description of the preparation of polycarbodiimides is set forth in EP 0 121 083 A1. Suitable water dispersible carbodiimides can also be prepared by incorporating polyethylene oxide or polypropylene oxide into the carbodiimide structure.

A polycarbodiimide can be dispersed into water by using a surfactant such as sodium dialkyl sulfosuccinate. Solvent borne carbodiimides, such as Ucarlink® XL255E and XL-20 can be simply added to a dispersion of polymer P with stirring. Alternatively, a water soluble polycarbodiimide can be prepared by reacting minor amounts of an amine such as dimethyl aminopropylamine and an alkyl sulfonate or sulfate into the carbodiimide structure as proposed in said EP 0 121 083.

Suitable water dispersible carbodiimides are commercially available. For example, Ucarlink® XL-295E, XL-20 (Union Carbide), Picassian® XL-725 (Stahl Polymers), Desmodur® XP 2802 (Covestro) and Carbodilite® V-02 (Nisshinbo) can be used in the present invention. Useful commercially available carbodiimides further include for instance Union Carbide's polymeric carbodiimides, Ucarlink® XL-255E and XL-20. Advanced, oligomeric, or polymeric carbodiimides may be advantageous, as they have lower toxicity.

The inventive water-based single-component sealant or adhesive composition may comprise at least one filler.

The term "filler" refers in the present disclosure to solid particulate materials, which are commonly used as fillers in water-based single-component sealant or adhesive compositions and which preferably have low water-solubility. Preferably, the filler has a water-solubility of less than 0.1 g/100 g water, more preferably less than 0.05 g/100 g water, most preferably less than 0.01 g/100 g water, at a temperature of 20° C.

A filler influences the rheological properties of the uncured composition and also the mechanical properties and the surface nature of the fully cured composition. Suitable fillers are inorganic and organic fillers, in particular silicas, especially finely divided silicas from pyrolysis processes, PVC powders, or other fillers that do not impart the optical properties of the composition regarding transparency. For this reason, the particle size of the fillers should not significantly exceed the particle size of dispersed polymer P.

Preferably, the one or more fillers are present in the single-component sealant or adhesive composition in a total amount of up to 60.0% by weight, preferably up to 45.0% by weight, most preferably up to 20.0% by weight, based on the total weight of the single-component sealant or adhesive composition.

In preferred embodiments, the sealant composition according to the present invention comprises at least one silica filler.

In other preferred embodiments, the sealant composition according to the present invention comprises no filler.

According to one or more embodiments, the single-component sealant or adhesive composition has a solids content of 45-90% by weight, preferably 50-88% by weight, most preferably 55-85% by weight.

The solids content as used herein refers to the portion of the aqueous dispersion adhesive composition, which when heated to a temperature of 105° C. for one hour at one atmosphere pressure does not volatilize. Accordingly, the solids content refers to polymeric materials, non-volatile plasticizers, inorganic solids and non-volatile organic materials, whereas the non-solid portion is generally comprised of water and any organic materials readily volatilized at 105° C.

The pH of the single-component sealant or adhesive composition is adjusted in the range of 7 to 12, preferably 8 to 11, in particular 8.5 to 10. The pH can be adjusted by addition of a water-soluble or water-miscible base, or the required pH range is achieved by use of a polymer P with alkaline functional groups, such as carboxylate or amine groups. Use of a base and/or adjustment of the pH within the above range helps to improve shelf-life of the composition and facilitates the preparation.

In preferred embodiments, especially when a non-alkaline polymer P is dispersed therein, a base is added to the composition according to the present invention. All commercially available, preferably water-soluble, bases may be used in an amount that renders the composition alkaline, preferably within the limits specified above. For example suitable are inorganic bases, such as NaOH, KOH, LiOH, or ammonia, or organic bases, in particular amines. Particularly preferred is aqueous ammonia ($NH_3$) as base. This base leads to especially good optical properties of the composition.

In preferred embodiments, said base is a volatile base, in particular ammonia or a volatile amine compound. The term "volatile" means in this context that the base is mobile and may evaporate under standard conditions from the composition during or after curing/drying. This has the advantage that under drying condition, the pH of the composition drops, which enables a particularly advantageous drying and cross-linking process.

The single-component sealant or adhesive composition according to the present invention may furthermore contain at least one additive selected from the list consisting of thixotropy agents, dispersants, fillers, plasticizers, emulgators, pigments, and biocides.

The single-component sealant or adhesive composition further optionally contains one or more plasticizers, preferably having at least one ester or ether group. The use of a plasticizer depends on the intended application and the polymer P used. Very soft polymers P with a very low $T_g$, such as for example −60° C., do not necessarily require the addition of a plasticizer. Furthermore, if the single-component sealant or adhesive composition is intended to be used as an elastic adhesive, plasticizer may also be minimized or omitted in the composition. For uses where a soft joint sealant (with low Shore A hardness) or a coating is required, and/or when using a polymer P with a higher $T_g$, such as for example −10° C., the use of a plasticizer is recommended.

The term "glass transition temperature" (abbreviated "$T_g$") refers to the temperature measured by differential scanning calorimetry (DSC) according to the ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Suitable plasticizers are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.# Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

The one or more plasticizers preferably having at least one ester or ether group can be present if at all in the single-component sealant or adhesive composition with a total amount of 0.5-30.0% by weight, for example 1.0-20% by weight, in particular 2.5-15.0% by weight, based on the total weight of the single-component sealant or adhesive composition.

In preferred embodiments of the single-component sealant or adhesive composition according to the present invention, the plasticizer preferably having at least one ester or ether group is selected from phthalate esters, cyclohexane esters, or benzoate esters.

The single-component sealant or adhesive composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters or acrylic liquid resins.

The single-component sealant or adhesive composition can also contain one or more further additives such as wetting agents, dispersion agents (dispersants), surfactants, emulgators, thickeners, thixotropic additives, anti-foams, flame retardants, stabilizers, colorants, antioxidants, UV-absorbers and/or biocides. Such further additives commonly used in water-based dispersion additives are known to a person skilled in the art.

Preferably, the composition contains no added thixotropic additives.

Suitable anti-foams are preferably compounds based on mineral oils or silicones. Suitable thickeners include compounds that are based on (meth)acrylic acid copolymers, cellulose derivatives, mineral thickeners such as silica, or mixtures thereof.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are customary preservatives, for example benzisothiazolinone (BIT), methylisothiazolinone (MIT), octylisothiazolinone (OIT), chloromethyl isothiazolinone (CMIT), and the like.

Surfactants may furthermore be useful and preferred for the compositions according to the present invention. Suitable surfactants include anionic, non-ionic, cationic or amphoteric surfactants, but preferably a non-ionic or anionic surfactant is employed. Generally the amount of surfactant employed will range from about 0.1 to about 5% by weight, based on the total weight of the sealant composition. Suitable non-ionic surfactants include fatty acid ethoxylates, fatty alcohol ethoxylates, polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

In some preferred embodiments of the single-component sealant or adhesive composition according to the present invention, the composition contains at most 1.0 wt.-%, preferably at most 0.5 wt.-%, most preferably no added ionic or non-ionic surfactants.

According to one or more embodiments, the total amount of the further additives is preferably 0.1-15.0% by weight, more preferably 0.5-10.0% by weight, based on the total weight of the single-component sealant or adhesive composition.

The single-component sealant or adhesive composition can be prepared by mixing the ingredients together at room temperature. Any suitable mixing apparatus can be used for the preparation of the adhesive composition without any special restrictions.

The single-component sealant or adhesive composition is especially suitable for sealing joints in or coating substrates of wood, plastic, such as PVC, or metal, mineral substrates such as plaster flooring, natural stone, concrete, cementitious levelling compounds or gypsum-based levelling compounds.

The single-component composition according to the present invention when intended to be used as a sealant preferably has a Shore A hardness after drying in air during 28d at 23° C. with a relative humidity of 50% of between 5 and 70, preferably between 10 and 50, more preferably between 15 and 40.

The single-component composition according to the present invention when intended to be used as an adhesive preferably has a Shore A hardness after drying in air during 28d at 23° C. with a relative humidity of 50% of at least 35, preferably at least 50, more preferably at least 60.

According to another aspect of the present invention, a method for sealing a joint between two substrates is provided, the method comprising steps of:
i) Applying the single-component sealant composition according to the present invention into the joint between two substrates,
ii) Exposing the wet sealant in the filled joint to air until the joint sealant and is dry and/or cured.

According to another aspect of the present invention, a method for adhesively joining two substrates is provided, the method comprising steps of:
i) Applying the single-component adhesive composition according to the present invention to a first substrate to form a wet layer of sealant on the first substrate, or applying the single-component adhesive according to the present invention to a first substrate and to a second substrate to form a wet layer of adhesive on both substrates,
ii) Exposing the wet layer to air,
iii) Joining a second substrate to the first substrate such that the wet layer on the first substrate is in contact with the second substrate, or such that both wet layers on both substrates are in contact with each other, to effect bonding there between.

The single-component sealant or adhesive composition can be applied on the surface of the substrate using for example, a toothed trowel or a roller.

According to another aspect of the present invention, use of the single-component sealant or adhesive composition of the present invention for sealing a joint between two substrates and/or for adhesively joining two substrates together is provided.

A further aspect of the present invention is the use of an epoxy- or carbodiimide-functional cross-linker C with an amount of between 0.5 and 5 wt.-%, based on the total composition, in an aqueous polymer dispersion having a pH of 7-12 and comprising at least one water-dispersed polymer P having a particle size of less than 150 nm, wherein said at least one water-dispersed polymer P is comprised in the composition with an amount of at least 45 wt.-%, based on the total composition, to improve the transparency and water-resistance of said composition in the curing or cured state when in contact with water.

All definitions and restrictions, as well as the preferred embodiments of the individual features as described throughout this document, are also valid for this aspect of the invention.

Yet another aspect of the present invention is a dried and/or cured single-component sealant or adhesive composition according to the present invention.

EXAMPLES

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example or test method.

Test Methods

Shore A hardness was determined according to DIN 53505 on samples with a layer thickness of 6 mm, cured for 7 days, 14 days, and 28 days at 23° C. (RT) and 50% relative humidity, or for 7 days at 40° C. Furthermore, several samples were measured after curing for 7 days at 40° C., followed by immersion in water for 7 days.

Average particle size was measured on a Zetasizer Nano-ZS by Malvern Panalytical in water at 25° C. at a reflective angle of 173 degree (backscattered).

Water uptake was measured by applying the wet sealant in round disc shaped mold with 4.2 cm diameter and 6 mm height. The specimen was allowed to dry for 7d at 40° C. at 20% relative air humidity. Then, the sealant was removed from the mold and its weight was measured on a lab balance. After 7d immersion into water, the water uptake was measured by weighing the specimen again.

Transparency was measured according to the following procedure: The test specimen for Shore measurements were subjectively judged and rated with marks from 1 (best, completely transparent) to 5 (worst, completely opaque). This rating was repeated several times after different storage times and conditions.

Aspect was measured according to the following procedure: An adhesive bead was applied to different substrates (porous or non-porous, bright or dark, reflective or non-reflective) and the transparency was compared after different drying times and rated with marks from 1 (best, completely transparent) to 5 (worst, completely opaque).

Preliminary Tests on Polymer P Dispersions

Several dispersions of polymer P (commercial dispersions) were analyzed regarding their particle size and their solids content (wt.-% of polymer P therein) was compiled according to the manufacturer's provided data. Only dispersions that have an average particle size of polymer P of less than 150 nm can be used in compositions according to the present invention. The data of the polymer P dispersions is displayed in Table 1.

TABLE 1

Commercial polymer P dispersions and their properties.

| Polymer P Dispersion | Trade name (supplier) | Chemical basis | Solids content (wt.-%) | Average particle size D50 (nm) |
|---|---|---|---|---|
| D1 (Ref.) | Primal ® 928ER (Dow) | Acrylate | 62.5 | 320 |
| D2 | DC SA13A (GIP S.A., Mexico) | Styrene acrylate | 55 | 100 |
| D3 | Alberdingk ® AC31 (Alberdingk Boley) | Acrylate | 50 | 95 |
| D4 (Ref.) | Plextrol ® UltraFine PR 3500 (Synthomer) | Acrylate | 29 | 42 |
| D5 | Orgal ® PR 056 (Organik Kimya) | Styrene acrylate | 50 | 133 |

These dispersions were then tested regarding transparency and behavior under dry (40° C.) and wet conditions (water). The results are shown in Table 2. The data shows that large particle dispersions are not able to produce sufficiently transparent cured products, neither in the dry nor in the wet state. Small particle dispersions do produce clear, transparent products in the dry state, but still suffer either from low transparency in the wet state or high water uptake. Dispersions with a low solids content (polymer P) show strongly decreased transparency in the wet state and very high water uptake.

TABLE 2

Test results for pure polymer P dispersions.

| Test method [unit] | Conditions | D1 (Ref.) | D2 | D3 | D4 (Ref.) | D5 |
|---|---|---|---|---|---|---|
| Transparency | 7 d 40° C. | 3.5 | 1 | 1 | 1 | 1 |
| Weight [g] | 7 d 40° C. | 6.28 | 4.81 | 3.74 | 0.80 | 3.87 |
| Transparency | 7 d H$_2$O | 5 | 1 | 2 | 5 | 3 |
| Weight [g] | 7 d H$_2$O | 7.32 | 9.84 | 3.87 | 1.62 | 4.18 |
| Water uptake [wt.-%] | 7 d 40° C. + 7 d H$_2$O | 16.56 | 51.1 | 3.48 | 102.50 | 8.0 |

Example Compositions C1 to C17

Several non-inventive reference (denoted "Ref.") and inventive example compositions were made with the above method from some of the polymer P dispersions in Table 1, bases as detailed in Table 3 and flowed by addition of cross-linker C as detailed in Table 4 according to the mixing procedure described below:

Mixing Procedure

All example compositions were prepared in a lab mixer using the following procedure:
a) Adjusting of the dispersion of polymer P to pH 8-9 by using a base.
b) Addition of the cross-linker C.
c) Mixing in a SpeedMixer™ (Hauschild) and filling of the preparations into cartridges.
d) Storing the cartridges for at least 24 h at 23° C. and 50% r.h. prior to initiating the testing procedure.

Details of the Example Compositions

TABLE 3

Type of polymer P dispersion and base comprised in each example composition C1 to C17.

| Example composition | Type (trade name) of polymer P dispersion | Wt.-% in dispersion | Base |
|---|---|---|---|
| C1 (Ref.) | Styrene acrylate DC SA13A (GIP S.A. Mexico) | 55 | 1.5 wt.-% aqueous NH$_3$ (25 wt.-% NH$_3$ in water); resulting pH = 8.7 |
| C2 (Ref.) | | | |
| C3 (Ref.) | | | |
| C4 | | | |
| C5 (Ref.) | | | |
| C6 | | | |
| C7 (Ref.) | Styrene acrylate Orgal PR 056 (Organik Kimya) | 50 | 0.6% aqueous NaOH (25 wt.-% NaOH in water); resulting pH = 9.0 |
| C8 (Ref.) | | | |
| C9 | | | |
| C10 | | | |
| C11 | | | |
| C12 | | | |
| C13 (Ref.) | Styrene acrylate Orgal PR 056 (Organik Kimya) | 50 | 0.3 wt.-% aqueous NH$_3$ (25 wt.-% NH$_3$ in water); resulting pH = 8.5 |
| C14 (Ref.) | | | |
| C15 | | | |
| C16 | | | |
| C17 | | | |

TABLE 4

Type and amount of cross-linker C comprised in each example composition C1 to C17.

| Example composition | Type (trade name) of cross-linker C | Functionality/ Chemistry | Amount (weight-%) |
|---|---|---|---|
| C1 (Ref.) | None | — | 0 |
| C2 (Ref.) | Tyzor ® 212 (Dorf Ketal) | Zirkonate | 2 |
| C3 (Ref.) | Auerzirc ® (Auer-Remy) | Zirkonate | 2 |
| C4 | Araldite ® DY-H (Huntsman) | Epoxy | 4 |
| C5 (Ref.) | Silquest ® A-187 (Momentive) | Epoxy | 0.4 |
| C6 | Silquest ® A-187 (Momentive) | Epoxy | 2 |
| C7 (Ref.) | None | — | 0 |
| C8 (Ref.) | Picassian ® XL-725 (Stahl Polymers) | Carbodiimide | 0.3 |
| C9 | Picassian ® XL-725 (Stahl Polymers) | Carbodiimide | 1.5 |
| C10 | Desmodur ® XP 2802 (Covestro) | Carbodiimide | 3 |
| C11 | Carbodilite ® V-02 (Nisshinbo) | Carbodiimide | 3 |
| C12 | Araldite ® DY-H (Huntsman) | Epoxy | 1 |
| C13 (Ref.) | None | — | 0 |
| C14 (Ref.) | Picassian ® XL-725 (Stahl Polymers) | Carbodiimide | 0.3 |
| C15 | Picassian ® XL-725 (Stahl Polymers) | Carbodiimide | 1.5 |
| C16 | Desmodur ® XP 2802 (Covestro) | Carbodiimide | 3 |
| C17 | Carbodilite ® V-02 (Nisshinbo) | Carbodiimide | 3 |

Test Results

The results of the test methods used on each example composition are detailed in Tables 5 to 7.

TABLE 5

Test results (aspect, Shore A hardness, transparency, and water uptake)

| Test method [unit] | Conditions | C1 (Ref.) | C2 (Ref.) | C3 (Ref.) | C4 | C5 (Ref.) | C6 |
|---|---|---|---|---|---|---|---|
| Aspect 1 d RT | 1 d RT | 1 | 1 | 1 | 1 | 1 | 1 |
| Shore A | 7 d 40° C. | 49 | 60 | 68 | 44 | 57 | 63 |
| Transparency | 7 d 40° C. | 1 | 1 | 1 | 1 | 1 | 1 |
| Shore A | 1 d H$_2$O | 9 | 12 | 30 | 38 | 28 | 49 |
| Transparency | 1 d H$_2$O | 3 | 2.5 | 3.5 | 1 | 3 | 1 |
| Water uptake [wt.-%] | 1 d H$_2$O | 51.1 | 49.5 | 31.5 | 3.3 | 39.4 | 4.6 |
| Shore A wet/dry | 1 d H$_2$O/ 7 d 40° C. | 0.18 | 0.25 | 0.59 | 0.86 | 0.49 | 0.78 |

TABLE 6

Test results (skin formation time and aspect)

| Test method conditions [unit] | C7 (Ref.) | C8 (Ref.) | C9 | C10 | C11 | C12 |
|---|---|---|---|---|---|---|
| Skin formation time [min] | 255 | 255 | 255 | 270 | 240 | 225 |
| Aspect (2 d RT on PE) | 4 | 4 | 3 | 2 | 3 | 2 |
| Aspect (2 d RT on concrete) | 3 | 2 | 2 | 2 | 1 | 2 |
| Aspect (7 d RT on concrete) | 4 | 2 | 2 | 2 | 1 | 1 |
| Aspect (3 d RT on aluminum) | 3 | 2.5 | 2 | 2 | 1.5 | 2.5 |
| Aspect (6 d RT on aluminum) | 3.5 | 2.5 | 2 | 2 | 1.5 | 2.5 |

TABLE 7

Test results (skin formation time and aspect)

| Test method conditions [unit] | C13 (Ref.) | C14 (Ref.) | C15 | C16 | C17 |
|---|---|---|---|---|---|
| Skin formation time [min] | 255 | 225 | 225 | 225 | 225 |
| Aspect (2 d RT on PE) | 2 | 2 | 2 | 2 | 1 |
| Aspect (2 d RT on concrete) | 3 | 3 | 1 | 2 | 1 |
| Aspect (7 d RT on concrete) | 2 | 2 | 1 | 1 | 1 |
| Aspect (3 d RT on aluminum) | 3 | 2.5 | 2 | 2 | 1 |
| Aspect (6 d RT on aluminum) | 3 | 2 | 1.5 | 2 | 1 |

The invention claimed is:

1. A single-component sealant or adhesive composition, comprising:
   a) an aqueous polymer dispersion comprising water and at least one water-dispersed polymer P having a median particle size D50 of less than 150 nm,
   b) at least one water-dispersed or water-dissolved epoxy- or carbodiimide-functional cross-linker C,
   wherein the pH of the composition is adjusted in the range of 7 to 12, and
   wherein the at least one water-dispersed polymer P is comprised in the composition with an amount of at least 45 wt.-%, based on the total composition, and
   wherein the epoxy- or carbodiimide-functional cross-linker C is comprised in the composition with an amount of between 0.5 and 5 wt.-%, based on the total composition.

2. The single-component sealant or adhesive composition according to claim 1, wherein the cross-linker C is an epoxy-functional cross-linker.

3. The single-component sealant or adhesive composition according to claim 2, wherein the epoxy-functional cross-linker C is a diglycidyl ether or a glycidoxy silane.

4. The single-component sealant or adhesive composition according to claim 1, wherein the median particle size D50 of polymer P is 120 nm or less.

5. The single-component sealant or adhesive composition according to claim 1, wherein said epoxy- or carbodiimide-functional cross-linker C is comprised in an amount of between 1 and 4 wt.-%, based on the total composition.

6. The single-component sealant or adhesive composition according to claim 1, wherein a base is comprised in the composition and the base is a volatile base.

7. The single-component sealant or adhesive composition according to claim 1, wherein the polymer P is a poly(meth)acrylate polymer or a styrene-(meth)acrylate copolymer.

8. The single-component sealant or adhesive composition according to claim 1, wherein the cross-linker C is a carbodiimide-functional cross-linker.

9. The single-component sealant or adhesive composition according to claim 1, wherein the composition contains no added ionic or non-ionic surfactants and/or no added thixotropic agents.

10. A method for sealing a joint between two substrates, the method comprising steps of:
    i) applying the single-component sealant composition according to claim 1 into the joint between two substrates,
    ii) exposing the wet sealant in the filled joint to air until the joint sealant and is dry and/or cured.

11. A method for adhesively joining two substrates, the method comprising the steps of:
    i) applying the single-component adhesive composition according to claim 1 to a first substrate to form a wet layer of sealant on the first substrate, or applying the single-component adhesive according to claim 1 to a first substrate and to a second substrate to form a wet layer of adhesive on both substrates,
    ii) exposing the wet layer to air,
    iii) joining a second substrate to the first substrate such that the wet layer on the first substrate is in contact with the second substrate, or such that both wet layers on both substrates are in contact with each other, to effect bonding there between.

12. A dried and/or cured single-component sealant or adhesive composition according to claim 1.

13. A method of making a single-component sealant or adhesive composition, comprising adding an epoxy- or carbodiimide-functional cross-linker C with an amount of between 0.5 and 5 wt.-%, based on the total composition, to an aqueous polymer dispersion having a pH of 7-12 and comprising at least one water-dispersed polymer P having a median particle size D50 of less than 150 nm, wherein the at least one water-dispersed polymer P is comprised in the composition with an amount of at least 45 wt.-%, based on the total composition, to improve the transparency and water-resistance of the composition in the curing or cured state when in contact with water.

* * * * *